US007647471B2

(12) United States Patent
Hastings et al.

(10) Patent No.: US 7,647,471 B2
(45) Date of Patent: Jan. 12, 2010

(54) METHOD AND SYSTEM FOR COLLECTIVE FILE ACCESS USING AN MMAP (MEMORY-MAPPED FILE)

(75) Inventors: Andrew B. Hastings, Eagan, MN (US);
Alok N. Choudhary, Chicago, IL (US);
Harriet G. Coverston, New Brighton, MN (US)

(73) Assignee: Sun Microsystems, Inc., Santa Clara, CA (US)

( * ) Notice: Subject to any disclaimer, the term of this patent is extended or adjusted under 35 U.S.C. 154(b) by 469 days.

(21) Appl. No.: 11/601,521

(22) Filed: Nov. 17, 2006

(65) Prior Publication Data

US 2008/0120474 A1    May 22, 2008

(51) Int. Cl.
*G06F 12/10* (2006.01)
(52) U.S. Cl. .................. 711/209; 711/153; 711/206
(58) Field of Classification Search .................. None
See application file for complete search history.

(56) References Cited

U.S. PATENT DOCUMENTS 6,496,909 B1 * 12/2002 Schimmel ................ 711/163
6,505,286 B1 *  1/2003 Kingsbury et al. .......... 711/170

OTHER PUBLICATIONS

Worringen, J. et al.; "Fast Parallel Non-Contiguous File Access"; Proceedings of SC2003: High Performance Networking and Computing; IEEE Computer Society Press, Nov. 2003; pp. 1-18.

Thakur, R. et al.; "Data Sieving and Collective I/O in ROMIO"; Proceedings of the Seventh Symposium in the Frontiers of Massively Parallel Computation; IEEE Computer Society Press, Feb. 1999, pp. 182-189.
Ross, R. et al.; "Implementing Fast and Reusable Datatype Processing"; Proceedings of the 10th European PVM/MPI Users Group Meeting, Springer-Verlag, Oct. 2003, pp. 404-413.
Worringen, J. et al.; "Exploiting Transparent Remote Memory Access for Non-Contiguous- and One-Sided-Communication"; Proceedings of the International Parallel and Distributed Processing Symposium; IEEE Computer Society Press, Apr. 2002; pp. 163-172.
Ching, A. et al.; "Efficient Structured Data Access in Parallel File Systems"; Proceedings of the IEEE International Conference on Cluster Computing (Cluster'03); IEEE Computer Society Press, Dec. 2003; pp. 326-335.
The Open Group Base Specificaitons Issue 6; IEEE Std 1003.1, 2004 Edition, Copyright 2001-2004 The IEEE and The Open Group; 8 pages.

* cited by examiner

*Primary Examiner*—Gary J Portka
(74) *Attorney, Agent, or Firm*—Osha • Liang LLP

(57) ABSTRACT

A method for processing using a shared file that includes creating a plurality of mmaps between a shared file and a plurality of address spaces, wherein each of the plurality of mmaps maps at least a portion of the shared file to one of the plurality of address spaces, and wherein each of the plurality of address spaces is associated with one of a plurality of processors, transferring, in parallel, data between the shared file and the address spaces using the plurality of mmaps associated with the plurality of address spaces, processing the data in parallel by the plurality of processors to obtain a result, wherein the plurality of processors access data from the plurality of address spaces, and storing the result in the shared memory.

16 Claims, 5 Drawing Sheets

METHOD AND SYSTEM FOR COLLECTIVE FILE ACCESS USING AN MMAP (MEMORY-MAPPED FILE)

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

A shared memory multiprocessor system includes multiple interconnected processors that share a common memory. The interconnection and the processing power provided by the shared memory multiprocessor system decreases the amount of time required to execute an application. From the perspective of the application, the application may be designed such that portions of the application may execute in parallel by the processors in the shared memory multiprocessor system.

For example, consider the scenario in which an application is designed to calculate the amount of precipitation across a region based upon a set of measured amounts of precipitation that are dispersed throughout the region. In such a scenario, the application may be designed such that each processor in the shared memory multiprocessor system calculates the precipitation for a sub-region of the region. If, for example, the shared memory multiprocessor system has four processors, then each processor may determine the precipitation for one quarter of the region. The processors may obtain and collate data using an initialization step and a finalization step. Further, during calculations, processors responsible for neighboring sub-regions may communicate calculations for the borders of the sub-region.

SUMMARY

In general, in one aspect, the invention relates to a method for processing using a shared file that includes creating a plurality of mmaps between a shared file and a plurality of address spaces, wherein each of the plurality of mmaps maps at least a portion of the shared file to one of the plurality of address spaces, and wherein each of the plurality of address spaces is associated with one of a plurality of processors, transferring, in parallel, data between the shared file and the address spaces using the plurality of mmaps associated with the plurality of address spaces, processing the data in parallel by the plurality of processors to obtain a result, wherein the plurality of processors access data from the plurality of address spaces, and storing the result in the shared memory.

In general, in one aspect, the invention relates to a system that includes a shared memory for storing a shared file, and a plurality of processors connected to the shared memory and configured to create a plurality of mmaps between the shared file and a plurality of address spaces, wherein each of the plurality of mmaps maps at least a portion of the shared file to one of the plurality of address spaces, and wherein each of the plurality of address spaces is associated with one of the plurality of processors, transfer, in parallel, data between the shared file and the address spaces using the plurality of mmaps associated with the plurality of address spaces, process the data in parallel by the plurality of processors to obtain a result, wherein the plurality of processors access data from the plurality of address spaces, and store the result in the shared memory.

In general, in one aspect, the invention relates to a shared memory computer system that includes a plurality of processors and a shared memory, wherein each processor in the plurality of processors is configured to create a mmap between a shared file and an address space associated with a processor, transfer, in parallel, data between the shared file and the address space using the mmap with the plurality of processors, and process the data by the processor to obtain processed data, wherein the processed data is used to obtain a result, wherein the result is stored in the shared memory, and wherein the shared file is in the shared memory and accessible by each of the plurality of processors.

Other aspects of the invention will be apparent from the following description and the appended claims.

DETAILED DESCRIPTION

Figure 1:
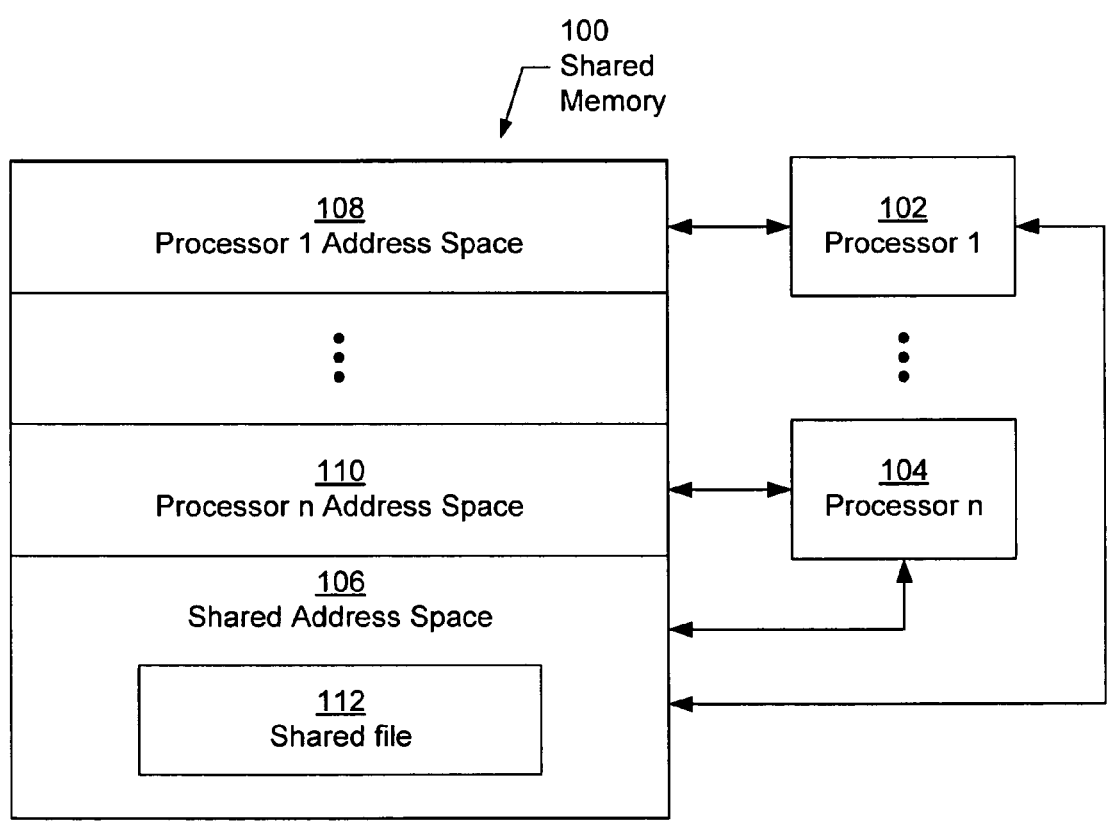
FIGS. 1-2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for transferring data between a shared file and the address spaces of multiple processors. More specifically, embodiments of the invention provide simultaneous mappings of the address spaces of each processor with the shared file. In one or more embodiments of the invention, instances of an application executing on the processors may directly obtain and write data to a file using load and store commands.

Figure 2:
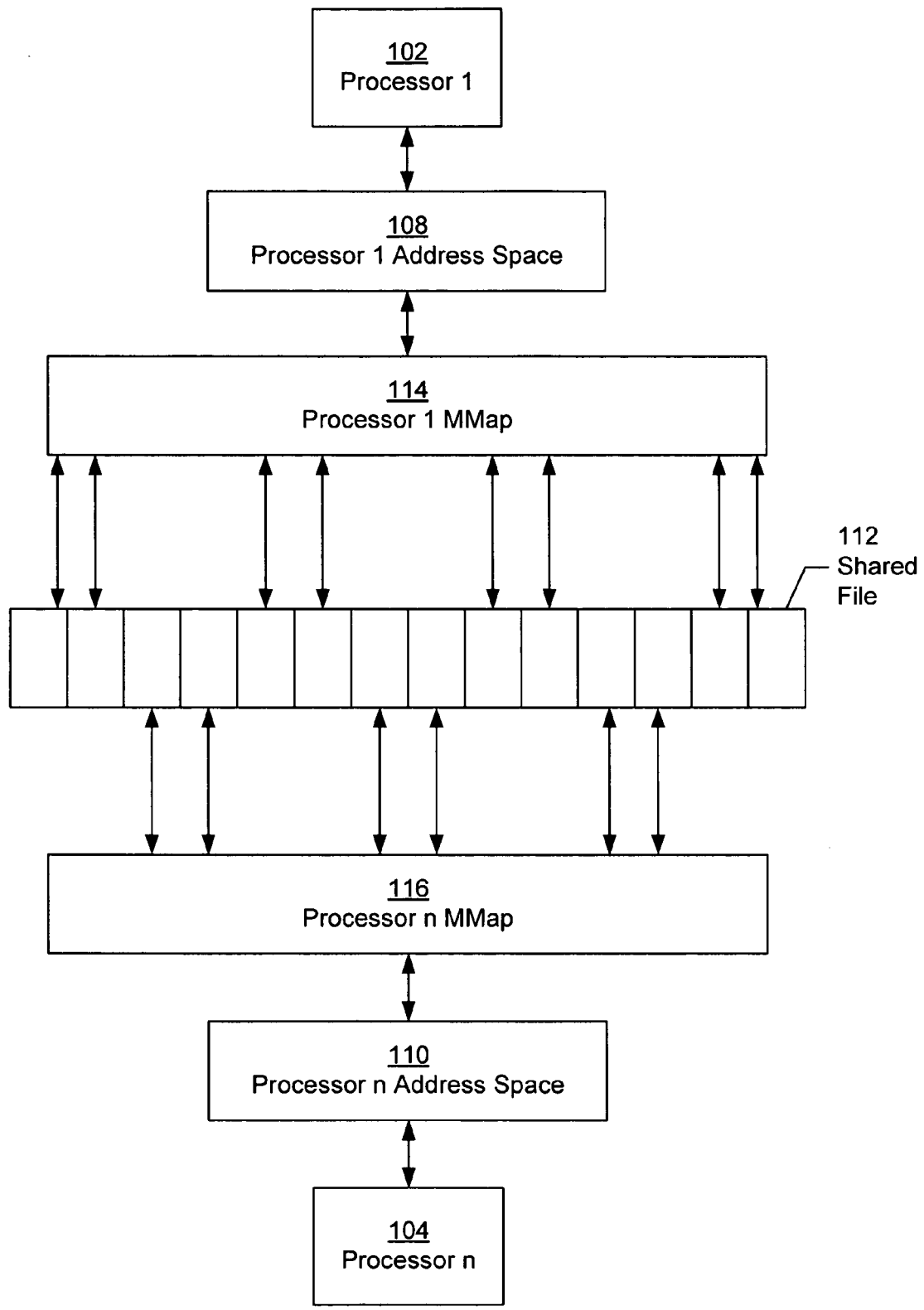

FIGS. 1-2 show schematic diagrams of a system for file access in accordance with one or more embodiments of the invention. FIG. 1 shows a shared memory computer system in accordance with one or more embodiments of the invention. As shown in FIG. 1, the shared memory computer system includes processors (e.g., processor 1 (102), processor n (104)) and shared memory (104). Each of these components is described below.

A processor (e.g., processor 1 (102), processor n (104)) corresponds to any type of entity that may be used to process instructions. The processor (e.g., processor 1 (102), processor n (104)) may include functionality to perform operations specified by an application including functionality to initialize an application. Specifically, in one or more embodiments of the invention, initializing execution of an application may involve specifying multiple processors, which execute portions of the application in parallel. In order to execute portions of the application, each processor may have an instance of the application stored in memory associated with the processor that the processor includes functionality to execute. The instance of the application executing on a particular processor may be designed or compiled so as to specify the portion of the application (or problem space) for which the particular processor is responsible.

For example, when initializing execution of the application across the processors, each processor may be associated with an identifier. The instructions of the application may specify the identifier corresponding to the processor which is to execute the instruction. Thus, a processor executing an instance of the application may execute only the instructions associated with the identifier corresponding to the processor.

The processors (e.g., processor 1 (102), processor n (104)) are connected to a shared memory (100). In one or more embodiments of the invention, shared memory (100) corresponds to any type of storage unit for storing data. Shared memory (100) may be divided into a shared address space (106) and processor address space (e.g., processor 1 address space (108), processor n address space (110)). The shared address space (106) corresponds to a region of the shared memory (100) that is accessible by two or more processors (e.g., processor 1 (102), processor n (104)).

As shown in FIG. 1, a shared file (112) may be located in the shared address space (106) in accordance with one or more embodiments of the invention. A shared file (112) corresponds to an interrelated storage area that is shared amongst the processors (e.g., processor 1 (102), processor n (104)).

In addition to the shared address space (106), the shared memory (100) also includes processor address space (e.g., processor 1 address space (108), processor n address space (110)) for two or more processors (e.g., processor 1 (102), processor n (104)). The processor address space (e.g., processor 1 address space (108), processor n address space (110)) corresponds to a storage area for any instance of one or more applications executing on each processor. Thus, the processor address space (e.g., processor 1 address space (108), processor n address space (110)) may be further subdivided into separate address spaces for each instance of the application executing on the processor. In one or more embodiments of the invention, the division of the processor address space dedicated to an instance of an application may be overwritten when the application halts execution.

Alternatively, the processor address space (e.g., processor 1 address space (108), processor n address space (110)) may correspond to virtual address space that references the shared address space (106). Specifically, rather than storing data in the processor address space and copying the data to the shared file, the processor may store data in what appears to the processor as a virtual address space but which is actually the shared file.

In one or more embodiments of the invention the shared file (112) may also reside in a virtual space. Portions of the shared file (112) may reside on a secondary storage device (not shown), such as a hard disk while the same or other portions simultaneously reside on a primary storage device such as Random Access Memory (RAM). A load or store to the shared file (112) by the processor (e.g., processor 1 (102), processor n (104)) may cause an immediate or delayed transfer of the corresponding portion of the shared file (112) between primary and secondary storage.

In one or more embodiments of the invention, because the shared file (112) is in the shared address space (106), the shared file (112) is privileged. Specifically, access to the shared file (112) may be regulated by a sharing mechanism, such as a monitor or semaphore, common amongst all processors. Alternatively, each processor includes permissions to access the processors' address space. Thus, an instance of an application executing on a processor does not require specific permission from the sharing mechanism common amongst all processors to access the portion of the processor address space dedicated to the instance of the application. Further, in one or more embodiments of the invention, an instance of an application executing on one processor is prevented from accessing another processor's address space.

FIG. 2 shows a schematic diagram of file access in accordance with one or more embodiments of the invention. Specifically, FIG. 2 shows a schematic diagram of connections between a processor (e.g., processor 1 (102), processor n (104)) and the shared file (112). As shown in FIG. 2, each processor (e.g., processor 1 (102), processor n (104)) is operatively connected to the processor address space (e.g., processor 1 address space (108), processor n address space (110)).

Interposed between the shared file (112) and the processor address space (e.g., processor 1 address space (108), processor n address space (110)) is a mmap (e.g., processor 1 mmap (114), processor n mmap (116)) for each processor (e.g., processor 1 (102), processor n (104)). In one embodiment of the invention, a mmap (e.g., processor 1 mmap (114), processor n mmap (116)) corresponds to a mapping between processor address space (e.g., processor 1 address space (108), processor n address space (110)) and the shared file (112). Specifically, an mmap operation corresponds to memory mapping a file. An mmap may also correspond to a mapped file segment or a mapped file page. In one or more embodiments of the invention, the mmap (e.g., processor 1 mmap (114), processor n mmap (116)) specifies the corresponding address within the shared file (112) for each address of the processor address space (e.g., processor 1 address space (108), processor n address space (110)). A processor (e.g., processor 1 (102), processor n (104)) associated with a mmap (e.g., processor 1 mmap (114), processor n mmap (116)) has the necessary permission to load and store data to the shared file (112), thereby bypassing any common sharing mechanisms.

The mmap (e.g., processor 1 mmap (114), processor n mmap (116)) provides a mechanism for a processor to access the shared file (112) as if the processor is accessing the processor's address space (e.g., processor 1 address space (108), processor n address space (110)). Specifically, rather than the processor acquiring permissions for each access to the shared file (112) from the common sharing mechanism discussed above, once the processor mmap is created, the processor may access the shared file without obtaining any permissions. For example, rather than performing read and write operations which require a system trap, the processor may directly perform a load and store operation to the processor address space and have the mmap automatically update the shared file.

Continuing with FIG. 2, an application that is designed or compiled to execute in parallel using multiple processors may be designed such that each processor requires interleaving portions of the shared file. For example, the instances of the application may specify that each processor performs the same calculations but on different interleaving portions of the shared file. Thus, mmaps associated with two different processors may include mappings to overlapping portions in the shared file. In such a scenario, multiple processors may have simultaneous permission to access the same portion of the shared file.

In one embodiment of the invention, the interleaving portions of the shared file may be specified according to regions of the shared file. A region of the shared file may correspond to a page in the shared memory. The portion of the shared file required may be specified by a offset, length pair. The offset may be based upon a first memory address of the shared file. The length may specify the number of bits from the first memory address for which data is required.

Figure 3:
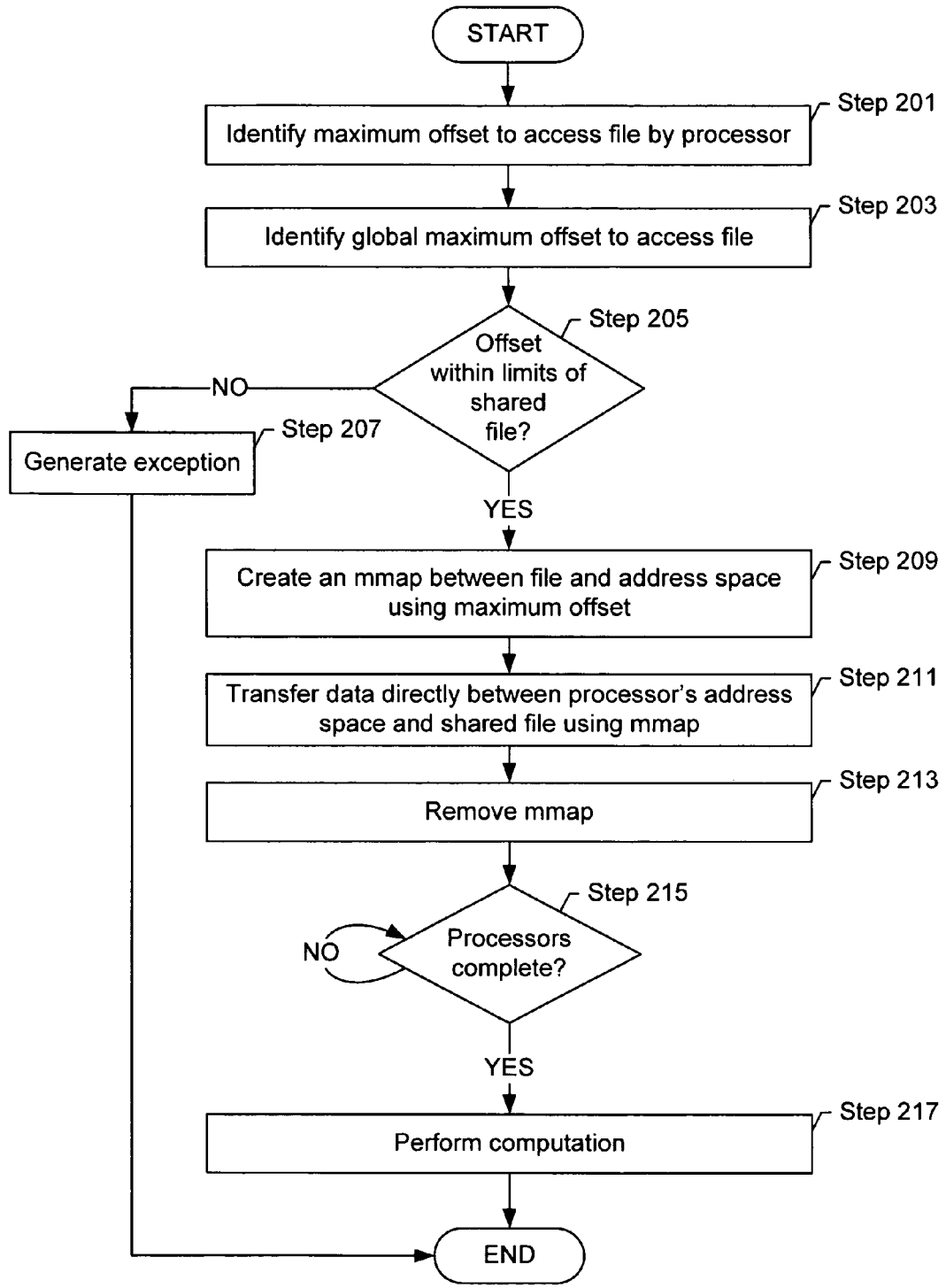
FIG. 3 shows a flowchart in accordance with one or more embodiments of the invention.

FIG. 3 shows a flowchart of a method for file access in accordance with one or more embodiments of the invention. Initially, a maximum offset to access the file by the processor is identified (Step 201). In one or more embodiments of the invention, the processor determines the maximum offset required by the instance of the application executing on the processor. Because the shared file may be partitioned across multiple processors and because each instance of the application is responsible for a different portion of the shared file, the maximum offset to access the shared file by each processor may vary depending on the processor.

Next, a global maximum offset to access the file is identified (Step 203). Specifically, the global maximum offset is the maximum offset required by any processor. Identifying the global maximum offset may be performed using message passing. Specifically, each processor, for example, may broadcast a message that includes its maximum offset. The largest maximum offset that is broadcast is the global maximum offset. Alternatively, if each processor has the same instance of the application executing on the processor, then processors that have data regarding the number of instances of the application and how the application partitions the shared file amongst the processors may be used to determine the global maximum offset.

Continuing with FIG. 3, a determination is made about whether the global maximum offset is within the limits of the shared file (Step 205). Specifically, a determination is made about whether any processor is attempting to access a portion of memory not designated by the shared file. Determining whether the global maximum offset is within the limits of the shared file may be performed when each processor requests the creation of the mmap. Specifically, when creating the mmap, the processor may send a request to the common sharing mechanism to create a mmap. At this stage, the common sharing mechanism may determine whether the instance of the application executing on all processors has permission to access the shared file and that all accesses for the shared file are within the memory confines of the shared file.

If the global maximum offset is not within the limits of the shared file, then an exception is generated (Step 207). In one or more embodiments of the invention, an exception implies that the processor(s) has not been given permission to access the shared file. At this stage, instances of the application may halt or an exception message may be generated.

As an alternative to generating an exception, if the global maximum offset is not within the limits of the shared file and if the access is a write access to the shared file, then the shared file may need to be expanded. Specifically, in one or more embodiments of the invention, a mmap cannot be created to reference a portion of the shared file that does not initially. Thus, even if the global maximum offset is a valid write position when the file is written, the shared file must have the storage area before the mmap can be created. One method for expanding the shared file is for a processor to store a bit at the highest offset. Thus, the shared file is forced to encompass the highest offset in accordance with one or more embodiments of the invention.

Continuing with FIG. 3, if the globally maximum offset is within the limits of the shared file or set to be within the limits of the shared file, than a mmap is created between the shared file and the address space using the maximum offset of the processor (Step 209). The creation of the mmap may require granting permission by the common sharing mechanism to enable the application to directly access the shared file. In one or more embodiments of the invention, the mmap for each processor only spans the range of addresses of the shared file required by the processor. Thus, a processor may not require mappings spanning the entire address range of the shared file. Instead, the mmap may only include mappings for the portion of the shared file required by the processor. Alternatively, all processors may have a mmap that spans the entire address range of the shared file.

In one or more embodiments of the invention, the creation of the mmaps may occur simultaneously. Specifically, each processor may simultaneously create and use a mmap that maps to the same portion of the shared file. Further, embodiments of the invention enable multiple processors to directly access the same region of the shared file without needing to obtain a lock or any other exclusivity mechanism for the region of the shared file.

Once the mmap is created, data may be transferred directly between the processor's address space and the shared file (Step 211). In one or more embodiments of the invention, transferring data between the processor's address space and the shared file may be performed using load and store commands rather than read and write commands, which require system traps. A load and store command treats the shared file as if the shared file is part of the processor address space. Specifically, using the load and store command, access to the shared file is transparent to the application executing on the processor in accordance with one or more embodiments of the invention.

Transferring the data may involve copying the data from the shared file to the address space of the processor. Alternatively, if the processor address space corresponds to a virtual address space, then data is only transferred for use by the processor when required. Thus, the processor performs the instructions of the instance of the application while using the mmap to access the shared file. In one or more embodiments of the invention, transferring data is efficient because the data is transferred in complete form (i.e., the data does not need to be packed and unpacked).

Once the data is transferred, the mmap is removed (Step 213). Specifically, when the mmap is no longer required, the processor may release permissions to access the mmap and, thereby, relinquish direct access to the mmap.

At this stage, a determination is made about whether the other processors have completed transferring data (Step 215). Specifically, the instance of the application may include a synchronization phase whereby all processors halt until a determination is made that the transferring of data has completed. In such cases, when a given processor reaches Step 215, the processor waits (e.g., sleeps) until all other processors (or at least the required processors) reach Step 215.

When the processors have completed transferring data (i.e., Step 215 is complete), the computation is performed (Step 217). Specifically, the processors may perform, in parallel, the instructions of the application (or a portion thereof) using the data transferred to the processors' address spaces in Step 211. The result(s) may then be stored in the shared memory (e.g., in the shared file). Storing the result(s) in shared memory may involve recreating the mmap(s) and loading the result(s) into shared memory using the mmap(s). Thus, the data transfer using the mmap may be bidirectional in accordance with one or more embodiments of the invention.

Figure 4:
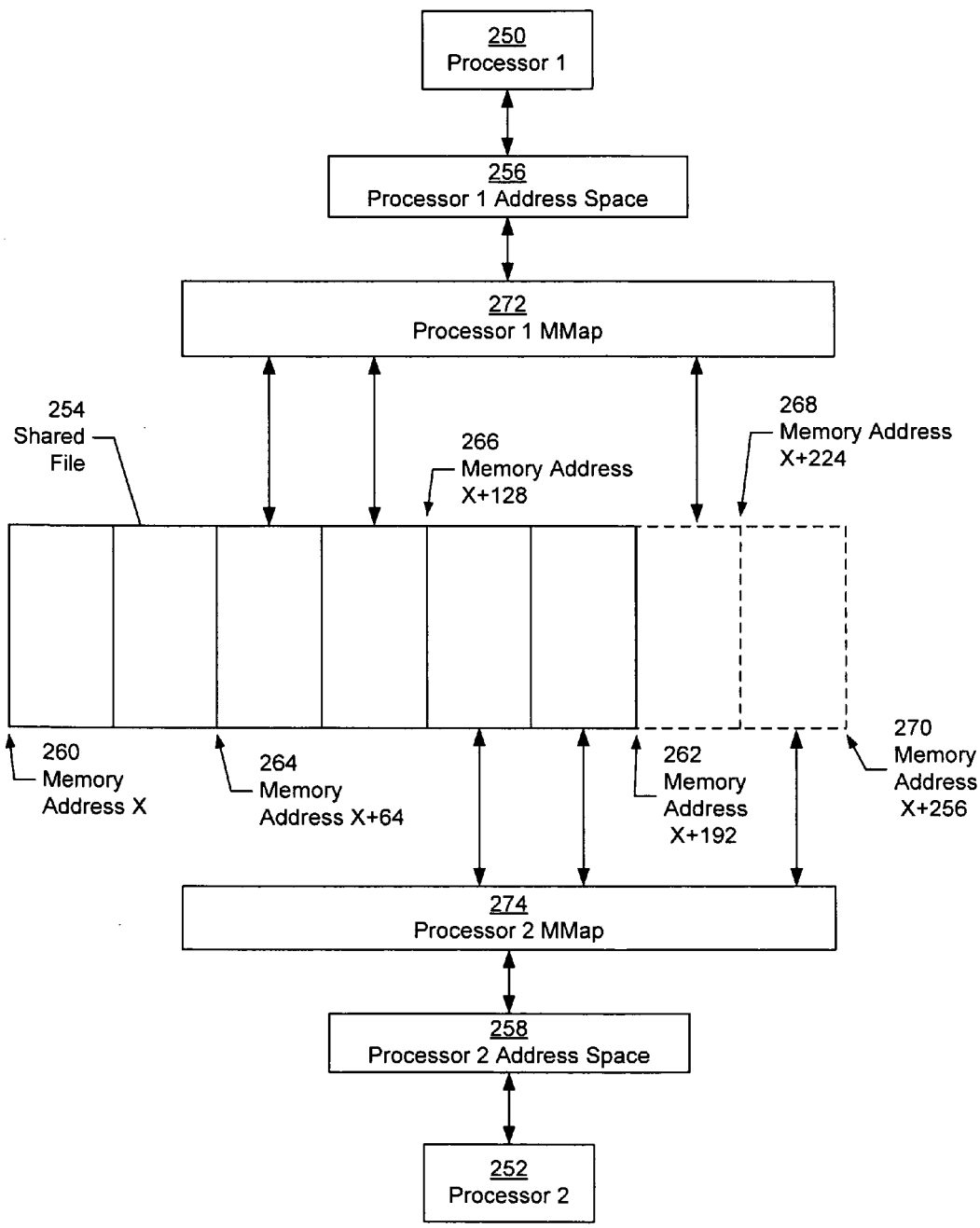
FIG. 4 shows an example in accordance with one or more embodiments of the invention.
Figure 5:
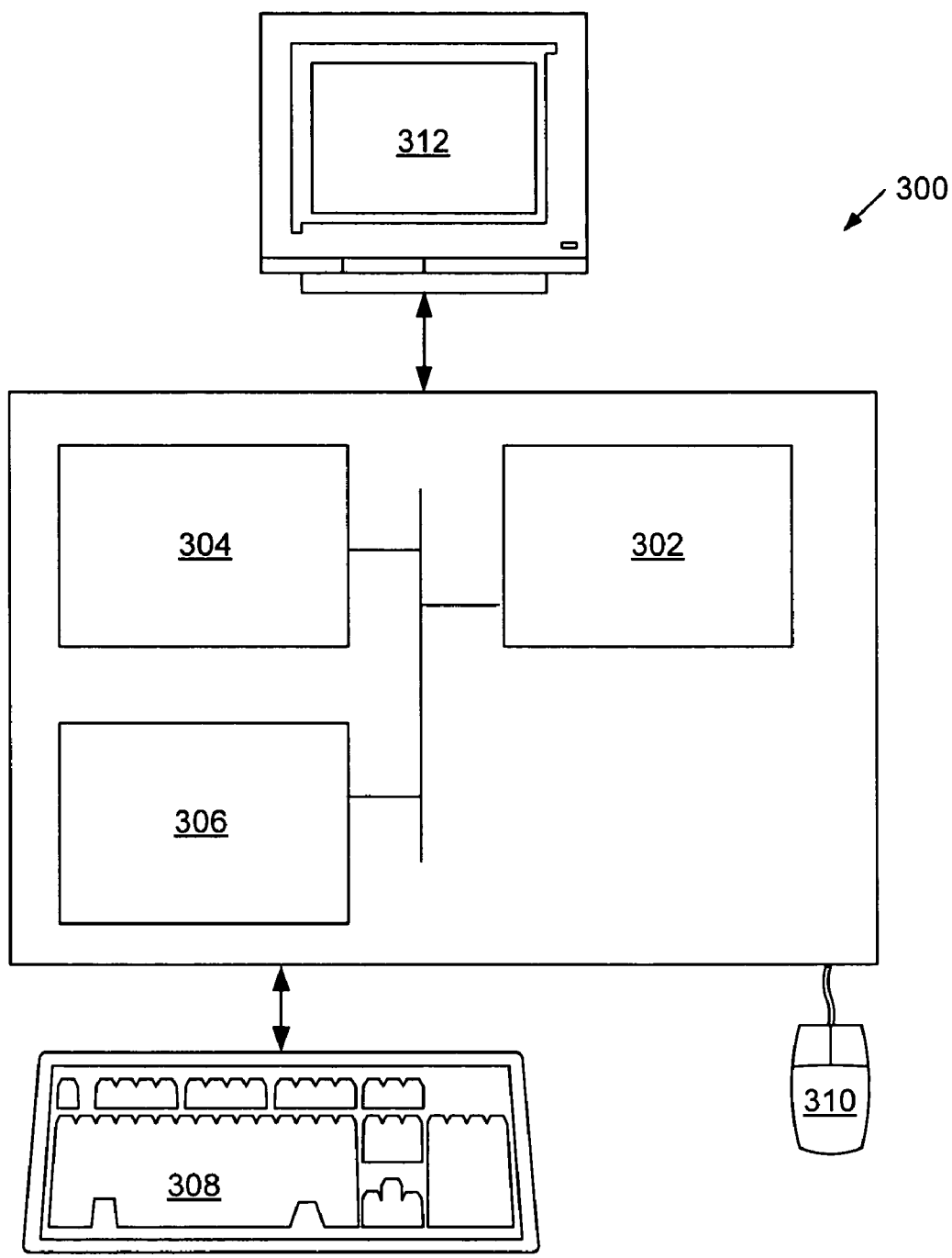
FIG. 5 shows a computer system in accordance with one or more embodiments of the invention.

FIG. 4 shows an example of file access in accordance with one or more embodiments of the invention. In the following example, consider the scenario in which two processors (e.g., processor 1 (250), processor 2 (252)) execute an application that performs computation on data from a shared file (254) and each append the result to the end of the shared file.

In the example, before starting the computation, the shared file (254) is stored between the shared memory address X (260) and memory address X+192 (262). Further, the data set from the shared file (254) assigned to processor 1 (250) is between memory address X+64 (264) and memory address X+128 (266). Additionally, processor 1 (250) is assigned to write a result to the shared file (254) between memory address X+192 (262) and X+224 (268), which is currently not a part of the shared file (254).

Similarly, the data set from the shared file (254) assigned to processor 2 (252) is between memory address X+128 (266) and memory address X+192 (262). Processor 2 (252) is assigned to write a result to the shared file (254) between memory address X+224 (268) and X+256 (270), which is also currently not a part of the shared file (254).

In order to perform the computation, initially, instances of the application are initiated on each processor (250, 252). Next, the processors (250, 252) determine their respective address ranges for accessing the shared file (254). Specifically, processor 1 (252) determines that the address range for processor 1 (252) is between memory address X+64 (264) and memory address X+224 (268). Similarly, processor 2 (252) determines that the address range for processor 2 (254) is between memory address X+128 (266) and memory address X+256 (270). Thus, the maximum offset for processor 1 (252) corresponds to memory address X+224 (268) and the maximum offset for processor 2 (254) corresponds to memory address X+256 (270). Through message passing, the processors may determine that the global maximum offset corresponds to memory address X+256 (270) and that the shared file (254) initially does not include the global maximum offset.

Accordingly, in the example, processor 2 (254) writes to memory address X+256 (270). The write to the memory address X+256 (270) may correspond to simply saving a 0 or 1 bit to the memory location in order to specify that the memory manager should expand the shared file (254) to include memory address X+256 (270). Once the write is complete, then the shared file (254) spans memory address X (260) to memory address X+256 (270).

Next, each processor creates a mmap (272, 274). The mmap (272) for processor 1 (250) spans the range designated by memory address X+64 (264) to memory address X+224 (268). Processor 2 mmap (274) spans the range designated by memory address X+128 (266) to memory address X+256 (270). Thus, processor 1 mmap (272) and processor 2 mmap (274) overlap and allow for simultaneous access to memory addresses between memory address X+128 (266) and memory address X+224 (268).

Using the mmaps (272, 274), both processors (250, 252) are able to load data from the shared file (254) and store results to the shared file (254). For example, processor 1 (250) may use its mmap (272) to retrieve data from the shared file (254) into its address space (256) and, further, to transfer data to the shared file (254) from its address space (256). Further, processor 2 (252) may retrieve data stored in the shared file (254) by processor 1 (250) by loading data from the shared file (254) by using its mmap (274).

If the processors' address spaces (256, 258) are virtual address spaces, then the processors (250, 252) may not need to copy data from the shared file (254) to the processors' address space (256, 258). Rather, each processor may maintain its respective mmap and perform loads and stores directly from the shared file (254) without requiring the data to be stored in the processors' address spaces (256, 258).

Embodiments of the invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of embodiments of the invention (e.g., processors, shared memory, map, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing using a shared file comprising:
creating a plurality of mmaps between a shared file and a plurality of address spaces,
wherein each of the plurality of mmaps maps at least a portion of the shared file to one of the plurality of address spaces,
wherein each of the plurality of address spaces is associated with one of a plurality of processors, and
wherein creating the plurality of mmaps comprises:
identifying, for the plurality of processors, a global maximum offset in a shared memory, wherein the global maximum offset is maximum of a plurality of maximum offsets required by the plurality of processors to access the shared file;
determining whether the global maximum offset corresponds to a memory location in the shared memory in which the shared filed is stored; and
expanding the shared file to encompass the memory location corresponding to the global maximum offset when the global maximum offset does not correspond to the memory location in the shared memory in which the shared file is stored;
transferring, in parallel, data between the shared file and the plurality of address spaces using the plurality of mmaps associated with the plurality of address spaces;
processing the data in parallel by the plurality of processors to obtain a result, wherein the plurality of processors access the data from the plurality of address spaces; and
storing the result in the shared memory.

2. The method of claim 1, wherein creating at least one of the plurality of mmaps further comprises:
  identifying a maximum offset of the plurality of maximum offsets for one of the plurality of processors to access the shared file;
  mapping a contiguous region of the shared file specified by the maximum offset; and
  storing the mapping in the at least one of the plurality of mmaps.

3. The method of claim 1, wherein transferring the data is performed using one selected from a group consisting of a load operation and a store operation.

4. The method of claim 1, wherein the data for each of the plurality of processors is stored in interleaving portions of the shared file.

5. The method of claim 1, wherein the at least two of the plurality of mmaps map at least one common portion of the shared file.

6. The method of claim 1, wherein transferring data between the shared file and the plurality of address spaces is performed transparently to each processor of the plurality of processors.

7. The method of claim 1, wherein the plurality of processors execute a common application to process the data.

8. A system comprising:
  a shared memory for storing a shared file; and
  a plurality of processors connected to the shared memory and configured to:
    create a plurality of mmaps between the shared file and a plurality of address spaces,
      wherein each of the plurality of mmaps maps at least a portion of the shared file to one of the plurality of address spaces, and
      wherein each of the plurality of address spaces is associated with one of the plurality of processors, and
      wherein creating the plurality of mmaps comprises:
        identifying, for the plurality of processors, a global maximum offset in the shared memory, wherein the global maximum offset is maximum of a plurality of maximum offsets required by the plurality of processors to access the shared file;
        determining whether the global maximum offset corresponds to a memory location in the shared memory in which the shared filed is stored; and
        expanding the shared file to encompass the memory location corresponding to the global maximum offset when the global maximum offset does not correspond to the memory location in the shared memory in which the shared file is stored;
    transfer, in parallel, data between the shared file and the plurality of address spaces using the plurality of mmaps associated with the plurality of address spaces;
    process the data in parallel by the plurality of processors to obtain a result, wherein the plurality of processors access the data from the plurality of address spaces; and
    store the result in the shared memory.

9. The system of claim 8, wherein creating at least one of the plurality of mmaps further comprises:
  identifying a maximum offset of the plurality of maximum offsets for one of the plurality of processors to access the shared file;
  mapping a contiguous region of the shared file specified by the maximum offset;
  storing the mapping in the at least one of the plurality of mmaps.

10. The system of claim 8, wherein transferring the data is performed using one selected from a group consisting of a load operation and a store operation.

11. The system of claim 8, wherein the data for each of the plurality of processors is stored in interleaving portions of the shared file.

12. The system of claim 8, wherein the at least two of the plurality of mmaps map at least one common portion of the shared file.

13. The system of claim 8, wherein transferring data between the shared file and the plurality of address spaces is performed transparently to each processor of the plurality of processors.

14. The system of claim 8, wherein the plurality of processors execute a common application to process the data.

15. A shared memory computer system comprising a plurality of processors and a shared memory, wherein each processor in the plurality of processors is configured to:
  create a mmap between at least a portion of a shared file and an address space associated with the processor;
  transfer, in parallel, data between the shared file and the address space using the mmap associated with the processor; and
  process the data by the processor to obtain processed data,
  wherein the processed data is used to obtain a result,
  wherein the result is stored in the shared memory,
  wherein the shared file is in the shared memory and accessible by each of the plurality of processors; and
  wherein at least one of the plurality of processors is configured to:
    identify, for the plurality of processors, a global maximum offset in the shared memory, wherein the global maximum offset is maximum of a plurality of maximum offsets required by the plurality of processors to access the shared file;
    determine whether the global maximum offset corresponds to a memory location in the shared memory in which the shared filed is stored; and
    expand the shared file to encompass the memory location corresponding to the global maximum offset when the global maximum offset does not correspond to the memory location in the shared memory in which the shared file is stored.

16. The shared memory computer system of claim 15, wherein transferring the data is performed using one selected from a group consisting of a load operation and a store operation.

* * * * *

UNITED STATES PATENT AND TRADEMARK OFFICE
CERTIFICATE OF CORRECTION

PATENT NO. : 7,647,471 B2  Page 1 of 1
APPLICATION NO. : 11/601521
DATED : January 12, 2010
INVENTOR(S) : Hastings et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this

Sixteenth Day of November, 2010

David J. Kappos
*Director of the United States Patent and Trademark Office*